April 6, 1948. W. E. STEWART 2,439,065
SPEED CONTROL BY MEANS OF TUNING FORKS
Filed Dec. 5, 1944
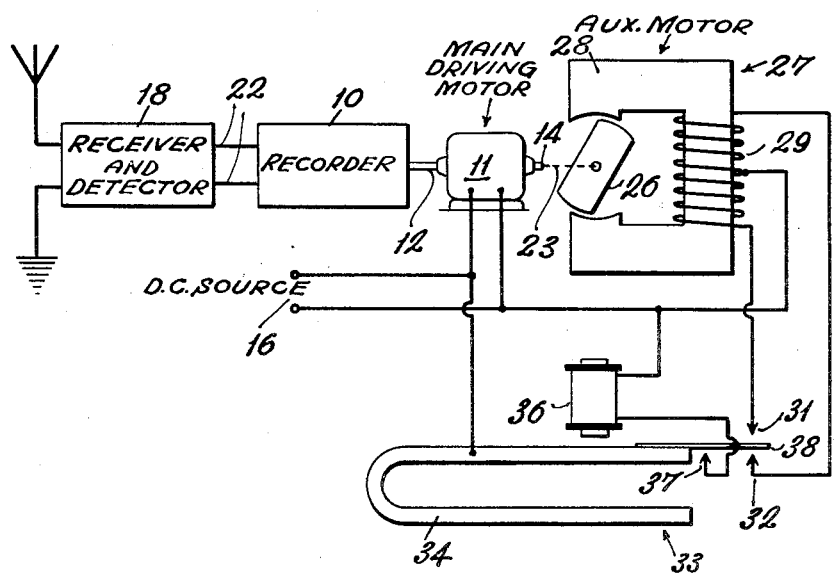
INVENTOR.
*Welby E. Stewart*
BY
*H. S. Grover.*
ATTORNEY Patented Apr. 6, 1948

2,439,065

UNITED STATES PATENT OFFICE 2,439,065

SPEED CONTROL BY MEANS OF TUNING FORKS

Welby E. Stewart, Indianapolis, Ind., assignor to Radio Corporation of America, a corporation of Delaware Application December 5, 1944, Serial No. 566,762

1 Claim. (Cl. 318—47)

The present invention relates to systems of and apparatus for speed control, and more particularly to a driving system embodying novel features for maintaining the speed of a movable element at a predetermined value.

There are many exacting requirements when rotating apparatus is to be driven at a speed which conforms to the speed of other rotating equipment. For example, the driving means of facsimile apparatus at one station not only must function in synchronism with the driving means of facsimile apparatus at the other station, but also a reasonably constant phase relationship must be maintained between the two driving means. The total mechanical power requirements are, in general, beyond the capacity of a frequency regulated source such as a crystal oscillator, a tuning fork vibrator, or the like. Also, considerable difficulty is encountered when the controlling frequency, whether locally generated or derived from a transmitted signal, is employed as a driving frequency for the apparatus because of the cost and size of the amplifiers for amplification of a frequency suitable for application to a motor to produce sufficient driving power for operating the motor to obtain a positive drive.

In accordance with the invention, a direct current source supplies the total driving power for the mechanical load represented by a piece of facsimile equipment. A portion of this total driving power appears as a locally generated frequency which provides an auxiliary mechanical effect to keep the apparatus accurately in step. The generation of the local frequency may be carried out under control of a transmitted signal, the amount of power which is taken from the signal source being negligible.

The principal object of the invention is to provide improved apparatus of simple parts for obtaining constant speed operation of a rotating driver in which the total driving power is obtained from a D. C. source.

Another object of the invention is to provide improved apparatus for obtaining constant speed operation of a driving system in which driving power is obtained from a source by converting a small percentage of the total energy drawn from the source into alternating current, thereby to obtain a speed controlling function.

Still another object of the invention is to provide an improved drive for a rotary element of a facsimile machine utilizing energy from a source.

Other objects and advantages of the invention will, of course, become apparent and immediately suggest themselves to those skilled in the art to which the invention is directed from a reading of the following specification in connection with the accompanying drawing which shows schematically a facsimile receiver including an illustrative embodiment of the invention.

Referring to the drawing, there is shown an illustrative example of an improved arrangement, in accordance with the invention, for driving a facsimile recorder, indicated schematically at 10, from a motor 11. The recorder 10 is provided with a rotatable driving shaft 12 which is mechanically connected to the motor shaft 14 directly as shown or through gearing, a clutch, or the like. It will be understood that the drive shaft 12 operates a scanner or the like ordinarily to be found in a facsimile recorder. The motor 11 in this example is of the variable speed type and receives its driving power directly from a connection 16 to any suitable supply circuit.

The facsimile receiving equipment is shown solely by way of example and may be of any kind or type. The arrangement shown is simple in form and comprises a receiver and detector 18 which applies signals in the customary manner over a connection 22 to the recorder 10. Synchronizing and framing signals, if present in the received signal, may be separated in the usual and known manner by any equipment (not shown) suitable for the purpose.

The drive shaft 14 of the main driving motor 11 is mechanically connected, as indicated by the dashed line 23, to the rotor 26 of an auxiliary motor 27. The motor 27 is preferably in the form of a small synchronous motor in which the rotor 26 runs in synchronism with the resultant alternating flux set up in the stator member 28. The rotor is formed to have salient poles, a construction which is usual in this type of low power synchronous motor. Electric clocks, for example, are frequently driven by a motor of this type. The field flux is produced by a center tapped winding 29, each end of which is connected to the fixed contacts 31 and 32 of a vibrator indicated in its entirety by reference character 33. The vibrator is shown as having the form of a tuning fork 34, however, it will be understood that a crystal controlled oscillator or the like may be employed to replace the mechanically resonant fork 34. Any other vibrating member, such as a tuned reed or the like, may be substituted for the fork 34.

Steady vibration of the fork 34 is insured in the customary manner by an electro-magnet 36 which is connected to one terminal of the connection 16 and to a contact 37 which cooperates with the vibrating contact 38 of the fork. The contact 37 is shown as being spaced from the contact 38, initial contact being obtained by starting the fork manually. One terminal of the connection 16 is connected to the fork structure 34 and the other is connected to the midpoint of the coil 29 so that as the fork vibrates, the flux in the coil and the flux in the stator member will alternate as stated previously.

In operation of the illustrative arrangement shown, the motor 11 furnishes the principal driving power for the recorder 10. The speed of the motor 11 preferably is adjusted by a field rheostat or the like (not shown) so that its speed is close to the speed at which the recorder is to run. When the fork is in operation and vibrating in its natural period, the synchronous speed of the rotor 26 is precisely equal to the desired speed of the recorder 10. The D. C. motor is thus adjusted to carry most or all of the load. The synchronous motor holds the combination at exactly the speed determined by the vibrator frequency, giving the motor combination the stable frequency and the speed characteristics of the vibrator. This condition holds whether a fork is employed as shown, illustratively, or an alternating current generator such as a crystal controlled oscillator. It will be understood that in accordance with the invention, the fork may be caused to vibrate at its natural rate by means of a synchronizing signal or the like derived from the received signal. Very little power will be needed for this operation, the driving power for the synchronous motor 27 being obtained from the connection 16.

Various modifications of the invention shown and described herein by way of example are possible without departing from the spirit and scope of the invention described herein, and it is desired that any and all of such modifications be considered within the purview of the present invention defined by the hereinafter appended claim.

Having now described the invention, what is claimed and desired to be secured by Letters Patent is the following:

In a facsimile system, a scanner, a power drive for said scanner including a direct current motor, an auxiliary motor for controlling the speed of said motor comprising a polarized rotor and a stator, a field winding on said stator having a center tap, a direct current supply source for said synchronous motor, means for connecting said synchronous motor to said direct current source comprising a tuning fork interrupter, said interrupter having a pair of stationary contacts connected respectively to each end of said field winding, a vibrating contact vibrating with said fork and connected to the lead of said D. C. source the other lead of said source being connected to said center tap, an electromagnet disposed adjacent one of the tines of said fork, a connection from one terminal of said electromagnet to said center tap, a connection from other terminal of said electromagnet to a stationary contact which cooperates with said vibrating contact, said fork being designed to inherently vibrate at a single frequency proportional to the desired speed of operation of said scanner.

WELBY E. STEWART.

REFERENCES CITED

The following references are of record in the file of this patent:

UNITED STATES PATENTS

| Number | Name | Date |
| --- | --- | --- |
| 843,415 | Northrup | Feb. 5, 1907 |
| 1,738,673 | Schroter | Dec. 10, 1929 |
| 1,783,157 | Taylor | Nov. 25, 1930 |
| 1,907,531 | Fitz Gerald et al. | May 9, 1933 |
| 2,066,680 | Gieskieng et al. | Jan. 5, 1937 |
| 2,218,859 | Schweitzer | Oct. 22, 1940 |

FOREIGN PATENTS

| Number | Country | Date |
| --- | --- | --- |
| 624,431 | France | July 18, 1927 |
| 633,918 | France | Feb. 6, 1928 |